United States Patent
Akita et al.

(10) Patent No.: US 7,145,939 B2
(45) Date of Patent: Dec. 5, 2006

(54) RECEIVING CIRCUIT

(75) Inventors: Hidenori Akita, Tokyo (JP); Hiroshi Katsuragawa, Parcoasis (SG); Tao Zhang, Fremont, CA (US); Tie Liu, Allentown, PA (US)

(73) Assignee: Oki Electric Industry Co., Ltd., Tokyo (JP)

( * ) Notice: Subject to any disclaimer, the term of this patent is extended or adjusted under 35 U.S.C. 154(b) by 852 days.

(21) Appl. No.: 10/158,838

(22) Filed: Jun. 3, 2002

(65) Prior Publication Data
US 2002/0191681 A1  Dec. 19, 2002

(30) Foreign Application Priority Data
Jun. 15, 2001  (SG) .............. 200103549-2

(51) Int. Cl.
*H04K 1/00* (2006.01)
*H04L 27/06* (2006.01)

(52) U.S. Cl. ........................ 375/147; 375/316

(58) Field of Classification Search .............. 375/147, 375/130, 146, 316
See application file for complete search history.

(56) References Cited

U.S. PATENT DOCUMENTS 5,812,607 A * 9/1998 Hutchinson et al. ........ 375/322

2003/0142726 A1 * 7/2003 Eltawil et al. ............... 375/146
2003/0142728 A1 * 7/2003 Lin ............................ 375/147

FOREIGN PATENT DOCUMENTS

JP   08185103   7/1996

\* cited by examiner

*Primary Examiner*—Temesghen Ghebretinsae
(74) *Attorney, Agent, or Firm*—Rabin & Berdo, P.C.

(57) ABSTRACT

A receiving circuit comprises an A/D converter which converts a receive signal to a digital signal having a first data format at a sampling rate corresponding to twice the spreading bandwidth of the receive signal, an analog front-end interface which converts the first data format of the digital signal to a second data format, a searcher which detects a phase of the digital signal having the second data format to perform a synchronization capture and outputs a timing signal, an interpolation filter which samples the digital signal having the second data format at a sampling rate different from the sampling rate of the A/D converter, a rake receiver which detects the synchronism of a signal outputted from the interpolation filter based on the timing signal and a demodulator which demodulates a signal outputted from the rake receiver.

6 Claims, 5 Drawing Sheets

RECEIVING CIRCUIT

BACKGROUND OF THE INVENTION

1. Field of the Invention:

The present invention relates to a receiving circuit suitable for use in a mobile communication apparatus, and particularly to a receiving circuit using CDMA (Code Division Multiple Access).

2. Description of the Related Art:

CDMA is a technique used in digital communications, particularly, mobile communications typified by a cellular telephone. CDMA, particularly, DS-CDMA (Direct Sequence CDMA) makes it possible to bring an information signal into a broad band by use of a spreading code independent of an information signal bandwidth and use a pseudo noise sequence or an orthogonal code or the like for the spreading code to thereby simultaneously use the same carrier frequency in several information signal communications.

A receiving circuit of the DS-CDMA system de-spreads a receive signal using a spreading code used in a desired information signal in order to take out or extract an information signal.

On the other hand, when it is desired to implement a DS-CDMA type receiver according to digital signal processing, it needs an A/D converter.

In the conventional voice communications or the like in which the amount of information per unit time, to be transmitted/processed is low, a sampling rate of an A/D converter has been set to eight times the spreading band.

However, in recent voice communications employed in multimedia communications or the like such as motion pictures, etc., the amount of information per unit time increases and a spreading bandwidth expands spontaneously. Therefore, when the eight times the spreading bandwidth is taken as the sampling rate as in the case of the conventional A/D converter, this causes an increase in power requirements of a receiving circuit and leads to an increase in the cost of the receiving circuit.

However, the mere reduction in the sampling rate of the A/D converter would incur degradation in receiving performance evaluated by a receiving BER (Bit Error Rate) or the like.

Thus, the purpose of the present invention is to provide a receiving circuit which does not cause degradation in receiving performance evaluated by a receiving BER or the like even if a sampling rate of an A/D converter is reduced.

SUMMARY OF THE INVENTION

The present invention provides a circuit for receiving a spectrum spread signal, comprising analog-to-digital converting means for executing analog-to-digital conversion with a predetermined sampling frequency to thereby convert a receive analog signal to a receive digital signal, and interpolation means for effecting an interpolate process on the converted receive digital signal to thereby generate an interpolation signal, whereby the interpolation signal is demodulated.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DETAILED DESCRIPTION OF THE PREFERRED EMBODIMENTS

FIRST PREFERRED EMBODIMENT

Figure 1:
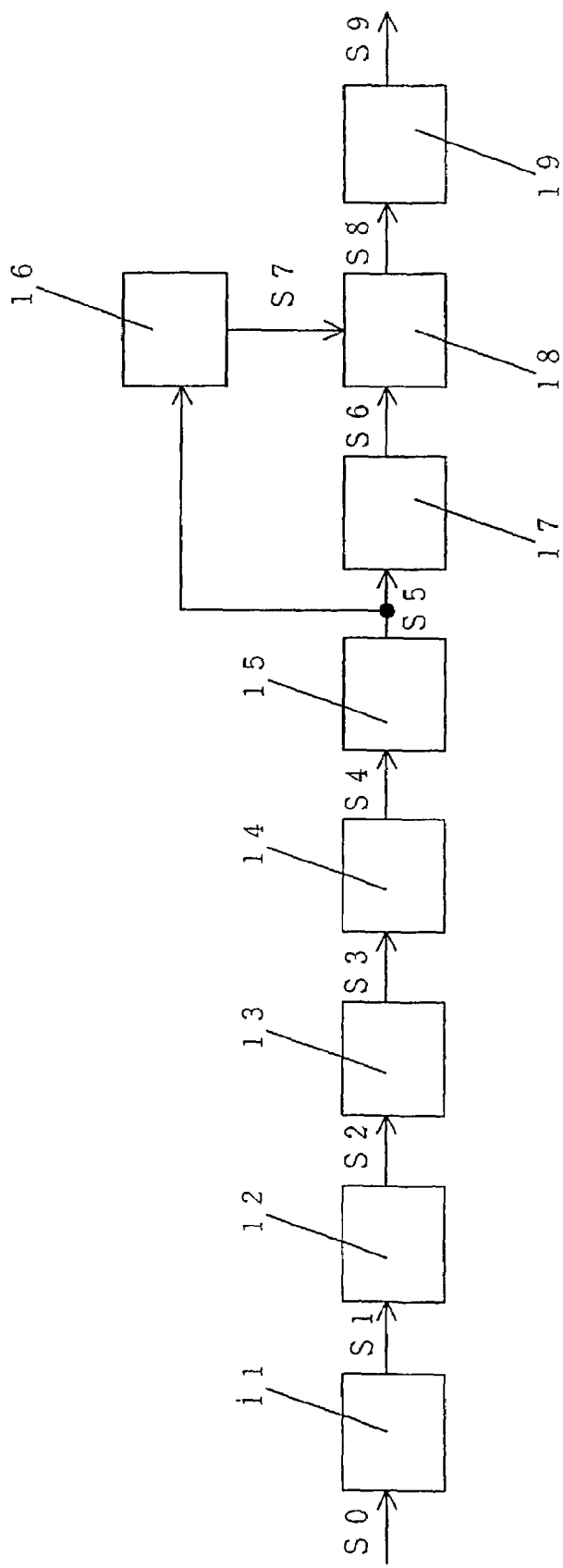
FIG. 1 is a block diagram showing a configuration of a receiving circuit of the present invention.

Receiving circuits according to preferred embodiments of the present invention will hereinafter be described in detail with reference to the accompanying drawings. The receiving circuits according to the embodiments of the present invention can be provided in a wireless device on the mobile station side and an apparatus on the fixed station side. Incidentally, elements or components respectively having the same functions in all the drawings for describing the receiving circuits according to the embodiments of the present invention are identified by the same reference numerals and their repetitive description will therefore be omitted.

FIG. 1 is a block diagram showing a configuration of a receiving circuit according to a first embodiment of the present invention. The receiving circuit 10 of the present invention comprises a low-pass filter (LPF) 11, an A/D converter 12, an analog front-end interface (AFE IF) 13, a DC offset adjustment circuit (hereinafter "DC offset adjust") 14, a receive filter 15, a searcher 16, an interpolation filter 17, a rake receiver 18, and a channel decoder 19.

The low-pass filter 11 cuts a high-frequency component of a receive signal S0 captured by an unillustrated antenna and outputs a signal S1 therefrom. The low-pass filter 11 roughly selects a desired spreading bandwidth from the receive signal S0.

The A/D converter 12 converts the signal S1 to digital signal S2 at a sampling rate corresponding to twice the spreading bandwidth of the receive signal S0.

The analog front-end interface 13 converts a format of the digital signal S2 to a format to be used in the DC offset adjust 14 provided at a stage subsequent thereto and outputs a signal S3 therefrom. For instance, when the data format of the digital signal S2 is one's complement and when the data format to be processed by the DC offset adjust 14 is two's complement, the analog front-end interface 13 converts the data format of the digital signal S2 to two's complement. Described specifically, when the digital signal S2 is one's complement "1010", the analog front-end interface 13 converts it to two's complement "1011".

The DC offset adjust 14 compensates for a DC offset of the signal S3 (bring back a zero point) and outputs a signal S4 therefrom.

The receive filter 15 extracts only a receiving band from the signal S4 and outputs a signal S5 therefrom. The receive filter 15 is called a "filter for receiving-band limitation".

The searcher 16 detects a spreading code which is in phase with the phase of the signal S5, performs a synchronization capture (acquisition) of the signal S5 and outputs the so-processed signal as a timing signal S7. To be concrete, the searcher 16 effects a sum-of-products operation on the signal S5 and a predetermined spreading code in order to determine correlation power, and compares the determined correlation power with a predetermined threshold value. The searcher 16 performs the sum-of-products operation and the comparison operation using the new correlation power and the new correlation power until the correlation power exceeds the threshold value. When the correlation power exceeds the threshold value, the searcher 16 detects a spreading code at the time that the correlation power has exceeded the threshold value, and performs synchronization capture on the signal S5. Here, the spreading code at the time that the correlation power has exceeded the threshold value, corresponds to the spreading code which is in phase with the phase of the signal S5.

The interpolation filter 17 increases the sampling frequency of the signal S5, and then generates a signal S6. As the interpolation filter 17, there are known various ones such as one using a Lagrange's method, one using a Sinc function, etc. Here, the interpolation filter using the Lagrange's method will be explained as an example.

The signal S5 corresponding to an input signal at an Xn point of the interpolation filter 17 is defined as f(Xn)=Yn, and the signal S6 corresponding to an output signal is defined as P(x). In doing so, the function of the interpolation filer 17 using the Lagrange's method can be represented by the following equation (1):

$$P(x) = \sum_{n=0}^{N} \left( \prod_{k=0, k \neq n}^{N} (x - x_k)/(x_N - x_k) \right) y_n \quad (1)$$

When the sampling frequency is four times in the interpolation filter 17, N is substituted the numeral "4" for. When that a sample interval of an input supplied to the interpolation filter 17 is 1, the output signal P(x) can be described by an interpolate polynomial equation given by the following equation (2):

The respective fingers 201, 202, . . . are demodulator circuits having internal configurations substantially identical to one another and respectively demodulate the receive signal S6 with a receive signal timing indicated by the signal S7 supplied from the searcher 16.

The combiner 21 serves as a portion for combining signals F0 through FM outputted from the respective fingers 201, 202, . . . with one another and outputting a signal S8 therefrom.

The multipass groups received and demodulated by the respective fingers 201, 202, . . . are combined into one by the combiner 21.

Figure 3:
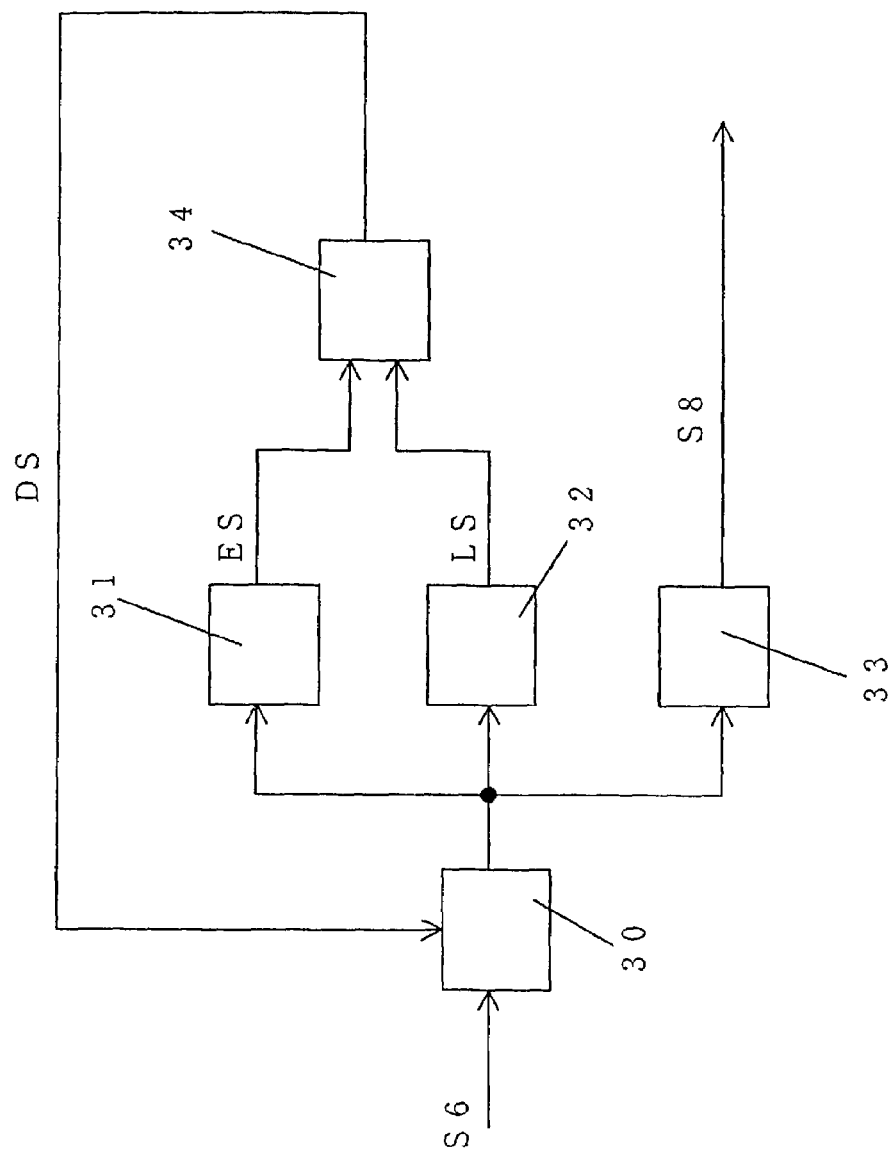
FIG. 3 is a block diagram showing a configuration of a finger of the receiving circuit of the present invention.

An internal configuration of each of the fingers 201, 202, . . . is represented as shown in FIG. 3. Since the fingers 201, 202, . . . are substantially identical to one another in internal configuration as described above, the description of the internal configuration of the finger 201 will be put forward with its internal configuration being principally shown in FIG. 3.

In FIG. 3, the finger 201 includes a decimator 30, a correlator early 31, a correlator late 32, data demodulator 33 and a DLL (Delay Lock Loop) unit 34.

The decimator 30 lets a signal S6 latch, based on a cycle of a decimation timing information signal DS output from the DLL unit 34, and outputs as the signal DS. Accordingly, the signal DR is represented in the form of a signal sequence obtained by thinning out the signal S6, and a sampling frequency is lower than the signal S6.

When the searcher 16 performs synchronization capture once and outputs a signal S7, spreading code generators built in the correlator early 31 and the correlator late 32 respectively generate spreading codes with or according to the generated phase corresponding to the signal S7.

However, the spreading code generator built in the correlator early 31 generates a spreading code with a phase (phase advanced by $\Delta t$, for example) which slightly leads from the phase of the signal S7, whereas the spreading code generator built in the correlator late 32 generates a spreading code with a phase (phase delayed by $\Delta t$, for example) which slightly lags from the phase of the signal S7.

$$P(x) = \frac{x(x-1)(x-2)}{(-1)(-2)(-3)} y_1 + \frac{(x+1)(x-1)(x-2)}{(-1)(-2)} y_2 + \frac{(x+1) \times (x-2)}{2(-1)} y_3 + \frac{(x+1) \times (x-1)}{2*3} y_4 \quad (2)$$

$$= \frac{1}{6}[-(x^3 - 3x^2 + 2x)y_0 + 3(x^3 - 2x^2 - x + 2)y_1 - 3(x^3 - x^2 - 2x)y_2 + (x^3 - x)y_3]$$

$$= \frac{1}{6}[(-y_0 + 3y_1 - 3y_2 + y_3)x^3 + (3y_0 - 6y_1 + 3y_2)x^2 + (-2y_0 - 3y_1 + 6y_2 - y_3)x + 6y_1]$$

When the interpolation filter using the Sinc function is applied to the interpolation filter 17, then an FIR (Finite Inpulse Response) filter for implementing the interpolation filter 17 needs at least sixteen taps. However, it can be implemented by four shift registers and eleven taps in the case of the above equation (2).

Figure 2:
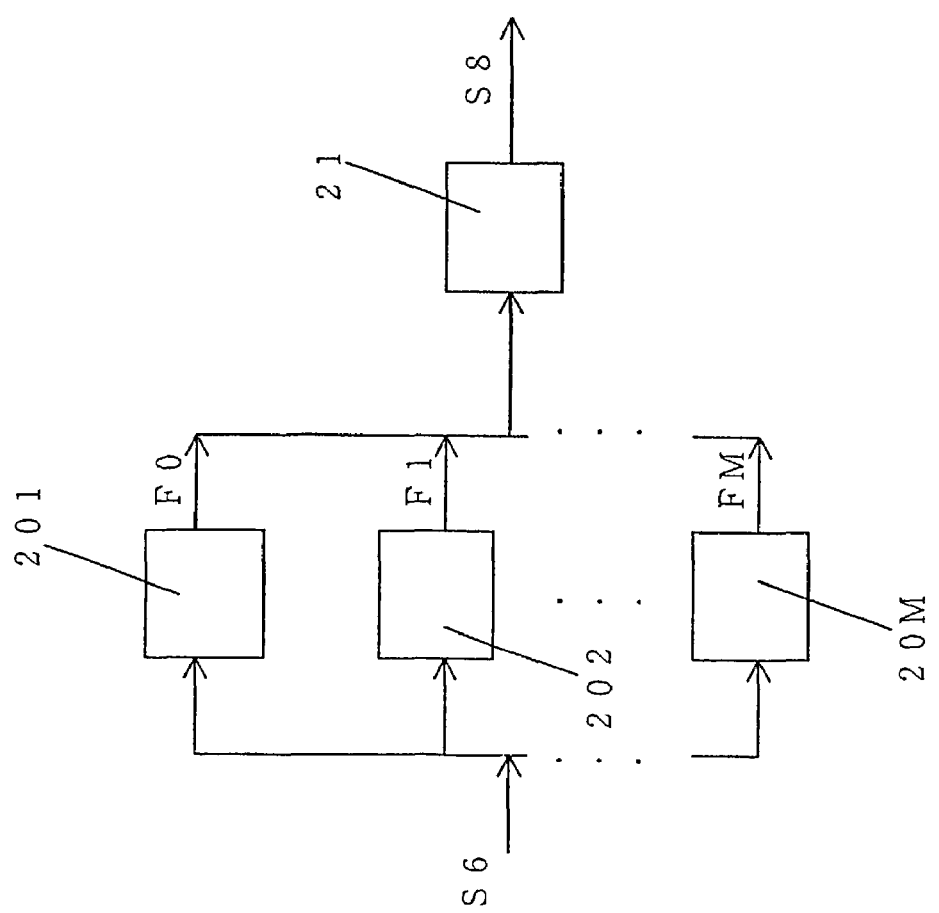
FIG. 2 is a block diagram showing a configuration of a rake receiver of the receiving circuit of the present invention.

An example of an internal configuration of the rake receiver 18 for receiving the signal S6 got by the equation (2) and receiving the signal S7 from the searcher 16 is given as shown in FIG. 2.

In FIG. 2, the rake receiver 18 includes M (where M is natural number greater than or equal to (2) fingers 201, 202, . . . , and a combiner 21.

The spreading code generator in the correlator early 31 and the spreading code generator in the correlator late 32 may respectively be implemented so as to take out spreading codes from different bit positions (corresponding to the lead and lag of each spreading code) in the same shift registers (corresponding to main bodies of spreading code generators).

The correlator early 31 performs a sum-of-products operation using both a spreading code whose phase is slightly advanced as compared with that of the signal S7 and a signal DR, and outputs the result of operation as a signal ES.

On the other hand, the correlator late 32 performs a sum-of-products operation using both a spreading code whose phase is slightly delayed as compared with that of the signal S7 and a signal DR and outputs the result of computation as a signal LS.

The DLL unit 34 receiving these signals ES and LS therein outputs a signal DS according to the error between the signals ES and LS. The DLL unit 34 also controls changes in the generated phases of spreading codes from the spreading code generators lying in the correlator early 31 and the correlator late 32, based on the error, in order to perform synchronization tracking. The changes is to a change in shift speed of each shift register or a change in cyclic speed of each spreading code.

The data demodulator 33 which is received the signal DR output from the decimator 30, performs a predetermined demodulating operation, and then gets a baseband signal as a signal S8.

Therefore, when a cellular phone wherein its receiving unit is equipped with the receiving circuit 10 using the CDMA system is moved, the rake receiver 18 can continue outputting the signal S8 which is enabled good communication.

The channel decoder 19 which is received the signal S8, performs a predetermined decoding operation, and outputs a signal S9.

The decoding operation corresponds to a coding operation executed on the transmitting side and normally includes an error-detecting process, an error-correcting process, etc.

The operation of the present embodiment having the above-described configuration will be described below.

The A/D converter 12 samples a receive signal S1 in the form of twice (chip2) the spreading bandwidth, performs analog-to-digital conversion and outputs the signal S2. The AFE interface 13 onverts the format of the signal S2 to a desired one, and the DC offset adjust 14 compensates for a DC offset of the signal S2.

The receive filter 15 outputs a signal S5 with a band restriction, based on a signal S4 outputted from the DC offset adjust 14.

The interpolation filter 17 sampling outputs a signal S6 of which the frequency is four times (chip 8) as much as the signal S5. Preparing an interpolation filter 17 having a configuration of such a type that N=4 is substituted in N of the above equation (1) makes it possible to produce the signal S6.

Since the sampling rate of the A/D converter 12 is twice as much as the spreading bandwidth, a gap between a sampling timing of the A/D converter and a desired timing P1 (see FIG. 4) of the receiving circuit has the ±¼ chip maximum.

Figure 4:
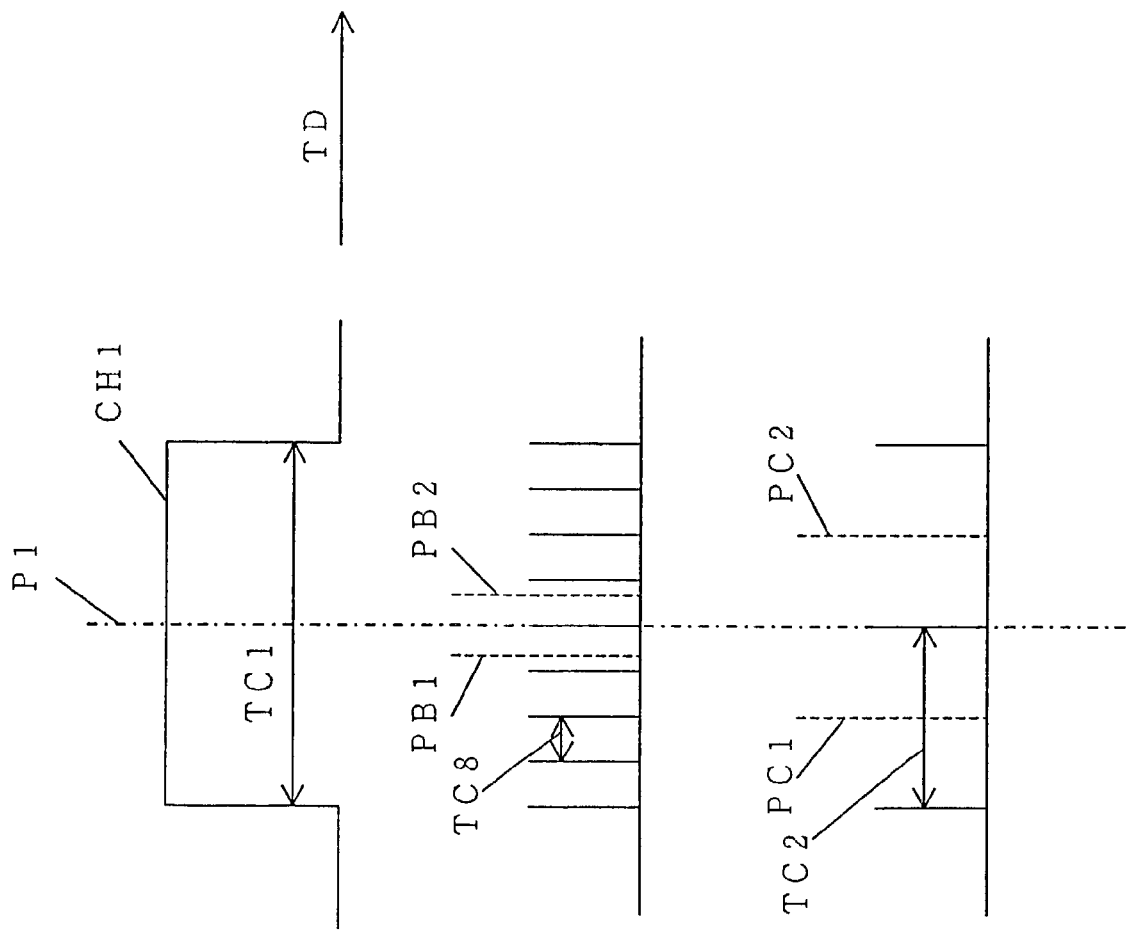
FIG. 4 is a timing diagram showing a sampling timing of an A/D converter of the present invention.

The above operation will be described with FIG. 4. Time passes in the direction indicated by the arrow TD. When the sum-of-products operation performed by the searcher 16 indicates a correlation peak in chip CH1 and when the sampling rate of the A/D converter 12 is sufficiently high, the time position of the correlation peak results is P1 indicated by a dashed line in FIGS. 4(A) through 4(C). The chip CH1 is one of chips of lots of symbols (i.e. chips) each constituting a spreading code.

FIG. 4(B) illustrates the case of the chip8 referred to above, and FIG. 4(C) illustrates the case of the chip2. In the case of the chip8, the sampling of the A/D converter 12 is carried out at time intervals TC8 each corresponding to only a time width equal to one-eighth of a time width TC1 of the chip CH1. In the case of the chip2, the sampling of the A/D converter 12 is performed at time intervals TC2 each corresponding to a time width equivalent to one-half of the time width TC1 of the chip CH1.

A description will next be made of the case where the difference between the time position of each correlation peak and the time position P1 of the sampling timing reaches the maximum, using FIG. 4.

Since the time position of a correlation peak is brought to PB1 (or PB2) indicated by a dotted line in FIG. 4(B) in the case of the chip8, the time width thereof results in one-sixteenth of the time width TC1 and is considered to have little effect on the characteristic of the receiving circuit. On the other hand, since the time position of a correlation peak is given as PC1 (or PC2) indicated by a dotted line in FIG. 4(C) in the case of the chip2, the difference between its time position and the time position P1 results in one-fourth of the time width TC1.

Assuming that the detection of each correlation peak ahead of the time position P1 is represented by ⌈+⌋ and the detection of each correlation peak after the time position P1 is represented by ⌈−⌋ the difference between the time position of the corresponding correlation peak in the case of chip 2 and the time position P1 reaches ±¼ of the TC1 at the maximum in the case of chip2.

Let's next assume that the difference between the receive timing information, i.e., signal S7 supplied from the searcher 16 to the rake receiver 18 and the time position P1 falls within ±½ chip and the pull-in width of the DLL unit 34 is given as ±½ chip. Even when the sampling timing of the A/D converter 12 has a maximum shift here, the rake receiver 18 is capable of pulling in a desired receive signal timing (i.e., the time position P1) from the output signal S6 corresponding to the chip8, of the interpolation filter 17 through the use of the DLL unit 34.

Figure 5:
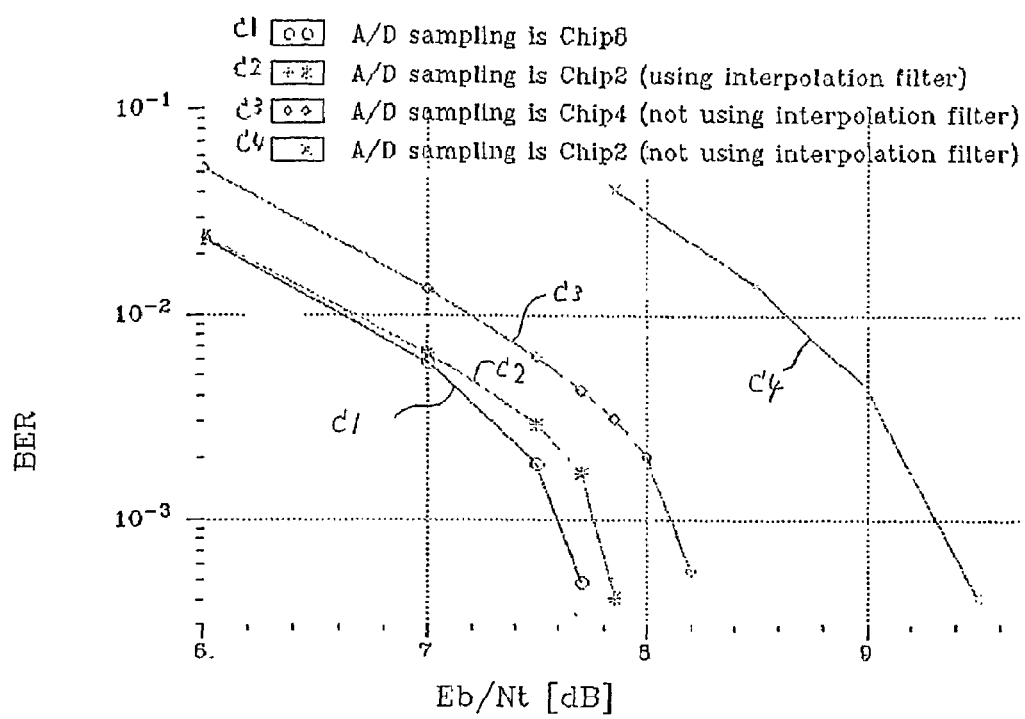
FIG. 5 is a diagram showing the result of simulation by the receiving circuit.

On the other hand, the results of simulations by the receiving circuit with respect to various cases in which the values of sampling rates of the A/D converter 12 and the presence or absence of the interpolation filter 17 differ, are shown in FIG. 5. In such simulations, an information signal makes use of 384 kbps, a spreading code uses 3.84 Mcps and a communication path or channel makes use of a Rayleigh fading channel of 245 Hz per path. Further, white noise was applied to the channel.

In FIG. 5, the vertical axis indicates BER, and the horizontal axis indicates Eb/Nt [dB]. Here, Eb/Nt indicates the ratio of total noise power to signal power per bit.

Further, a curve C1 shows that the sampling rate is give as chip8 and the sampling timing is given as the time position P1. Curves C2 and C4 respectively indicate that the sampling rate is given as chip2 and the sampling timing is placed in a position shifted by one-fourth of the TC1 as viewed from the time position P1. However, the curve C2 shows a state in which information about chip8 is reproduced from information sampled at chip2 through the use of an interpolation filter, and data at the timing of the time position P1 is pulled in. A curve C3 indicates that the sampling rate is given as chip4, and the sampling timing is placed in a position shifted by one-eighth of the TC1 as viewed from the time position P1.

The curves C1, C3 and C4 make no use of the interpolation filter 17, whereas only the curve C2 makes use of the interpolation filter 17.

Here, a curve corresponding to the receiving circuit 10 according to the present embodiment is given as the curve C2.

As is apparent from FIG. 5, there is a tendency that when comparisons are made among the curves C1, C2 and C4, BER decreases with an increase in sampling rate of an A/D converter (corresponding to the A/D converter 11, for example) if the values of Eb/Nt are identical to each other, and thereby the quality of reception is improved. However, the curve C2 corresponding to the present embodiment indicates a fairly good result that it is close to the curve C1 of chip8 even though the sampling rate is low like chip2.

Further, the receive quality of the curve C2 is evidently high even as compared with the curve C3 in which the sampling rate of the A/D converter is given as chip4.

According to the present embodiment, while a smaller sampling rate is being used, degradation in performance due to the influence of each sampling timing of an A/D converter is reduced and the accuracy is maintained, whereby high communication quality can be obtained.

Thus, even when multimedia communications such as motion pictures, etc. are supported by mobile communications, a receiving circuit can be provided which is reduced in power consumption and low in cost.

Incidentally, while the aforementioned embodiment has described, as an example, the case in which the receiving unit of the cellular telephone is equipped with the receiving circuit according to the present embodiment, the receiving circuit of the present invention can be used even for other applications.

The receiving circuit of the present invention can also be applied to receive-only communication equipment, for example.

Further, the present invention can be applied to a spectrum spreading-signal receiving circuit other than the receiving circuit.

Furthermore, the transfer of communication equipment provided with the spectrum spreading-signal receiving circuit of the present invention is not an essential condition for the present invention. Even when, for example, the spectrum spreading-signal receiving circuit is installed in a fixed station and the party to communicate therewith is moved, the present invention is applicable.

While many numeric values are shown in the aforementioned embodiment, they are merely shown by way of example. Therefore, the scope of application of the present invention is not limited by these numeric values.

According to the spectrum spreading-signal receiving circuit of the present invention as described above, its receiving performance can be kept high while a sampling frequency of analog-to-digital converting means is being reduced.

Thus, a receiving circuit can be provided which is low in power consumption and cost by comparison with its communication quality.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. A receiving circuit, comprising:
   an A/D converter which converts a receive signal to a digital signal having a first data format at a sampling rate corresponding to twice the spreading bandwidth of the receive signal;
   an analog front-end interface which converts said first data format of said digital signal to a second data format;
   a searcher which detects a phase of said digital signal having said second data format to perform a synchronization capture and outputs a timing signal;
   an interpolation filter which samples said digital signal having said second data format at a sampling rate different from said sampling rate of said A/D converter;
   a rake receiver which detects the synchronism of a signal outputted from said interpolation filter, based on said timing signal; and
   a demodulator which demodulates a signal outputted from said rake receiver.

2. The receiving circuit according to claim 1, further comprising a low-pass filter which cuts a high-frequency component of a receive signal and outputs a filtered receive signal to the A/D converter.

3. The receiving circuit according to claim 1, further comprising a DC offset adjust which compensates for a DC offset of the digital signal having the second data format and outputs a compensated digital signal having the second data format.

4. The receiving circuit according to claim 3, further comprising a receive filter which extracts only a receiving band from the digital signal output by the DC offset adjust.

5. The receiving circuit according claim 1, wherein the rake receiver comprises:
   a plurality of fingers, each finger demodulating the signal output by the interpolation filter according to the timing signal; and
   a combiner which combines demodulated signals output from each finger.

6. The receiving circuit according to claim 5, wherein each finger comprises:
   a decimator which latches the signal output from the interpolation filter based on a decimation timing information signal and outputs a latched signal;
   a correlator early which performs a sum-of-products operation using a spread code whose phase is slightly advanced as compared with the latched signal;
   a correlator late which performs a sum-of-products operation using a spread code whose phase is slightly delayed as compared with the latched signal;
   a DLL which generates the decimation timing information signal based on the signals output from the correlator early and the correlator late; and
   a data demodulator which demodulates the latched signal.

* * * * *